(12) United States Patent
Cording

(10) Patent No.: US 7,891,154 B2
(45) Date of Patent: Feb. 22, 2011

(54) ANTI-FOG REFRIGERATION DOOR AND METHOD OF MAKING THE SAME

(75) Inventor: Christopher R. Cording, Kingsport, TN (US)

(73) Assignee: AGC Flat Glass North America, Inc., Alpharetta, GA (US)

( * ) Notice: Subject to any disclaimer, the term of this patent is extended or adjusted under 35 U.S.C. 154(b) by 0 days.

(21) Appl. No.: 11/396,914

(22) Filed: Apr. 4, 2006

(65) Prior Publication Data

US 2006/0265979 A1 Nov. 30, 2006

Related U.S. Application Data

(63) Continuation-in-part of application No. 11/229,835, filed on Sep. 20, 2005, now abandoned.

(60) Provisional application No. 60/610,964, filed on Sep. 20, 2004, provisional application No. 60/700,308, filed on Jul. 19, 2005.

(51) Int. Cl.
*E04G 21/00* (2006.01)

(52) U.S. Cl. .................... 52/741.4; 52/171.2; 52/171.3; 52/204.6; 52/204.71

(58) Field of Classification Search ................ 52/171.3, 52/171.2, 204.5, 204.6, 204.71, 786.1, 741.1; 428/447, 448, 429
See application file for complete search history.

(56) References Cited

U.S. PATENT DOCUMENTS 3,659,896 A * 5/1972 Smith et al. .................... 296/93
4,467,073 A 8/1984 Creasy (Continued)

FOREIGN PATENT DOCUMENTS

| JP | 09229546 A | 9/1997 |
| WO | WO 00/71481 A1 | 11/2000 |
| WO | 2004013063 A1 | 2/2004 |

OTHER PUBLICATIONS

U.S. Appl. No. 10/777,210, "Energy-free Refrigeration Door and Method for Making the Same", Cording, Christopher.*
Film Specialties, Inc., Introducing Vistex Fog Free Film, Whitehouse, NJ.
Film Specialties, Inc., Material Safety Data Sheet, Dec. 18, 1997, Hillsborough, NJ.

*Primary Examiner*—Richard E Chilcot, Jr.
*Assistant Examiner*—William V Gilbert
(74) *Attorney, Agent, or Firm*—Rothwell, Figg, Ernst & Manbeck, P.C.

(57) ABSTRACT

The energy-free refrigeration door of the present application provides a way to control condensation when the door of a refrigeration unit is opened by providing thermal insulation to the door with glass panels which have a low emissivity coating. The door includes a door frame housing and an insulating glass unit comprising inner, middle and outer sheets of glass. A first sealant assembly disposed around the periphery of the inner and middle sheets of glass forms a first chamber between the inner and middle sheets of glass. A second sealant assembly disposed around the periphery of the middle and outer sheets of glass forms a second chamber between the middle and outer sheets of glass. A gas, such as krypton, air, or argon is held in the first and second chambers. The outer sheet of glass and inner sheet of glass each have an unexposed surface that faces the middle sheet of glass. A low emissivity coating is disposed on the unexposed surfaces of the inner and outer sheets of glass so that the glass door as a whole avoids formation of condensation on the outer surface of the outer sheet of the glass door, without the application of electricity to heat the door, while also providing the desired evaporation rate of condensation from the inner side of the inner sheet of the glass door. An anti-fog or anti-frost coating is included on a surface of one of the sheets of glass.

78 Claims, 4 Drawing Sheets

U.S. PATENT DOCUMENTS

| | | | |
|---|---|---|---|
| 4,551,484 A | 11/1985 | Rädisch et al. | |
| 4,735,830 A * | 4/1988 | Oezelli et al. | 427/407.2 |
| 4,745,152 A | 5/1988 | Fock et al. | |
| 4,767,671 A | 8/1988 | Parker et al. | |
| 5,116,442 A | 5/1992 | Daude et al. | |
| 5,210,169 A | 5/1993 | Mühlebach et al. | |
| 5,262,475 A | 11/1993 | Creasy | |
| 5,451,460 A | 9/1995 | Lu et al. | |
| 5,723,175 A * | 3/1998 | Scholz et al. | 427/161 |
| 5,766,739 A | 6/1998 | Funaki et al. | |
| 5,852,284 A | 12/1998 | Teder et al. | |
| 5,877,254 A * | 3/1999 | La Casse et al. | 524/590 |
| 6,052,965 A | 4/2000 | Florentin et al. | |
| 6,148,563 A | 11/2000 | Roche et al. | |
| 6,367,223 B1 | 4/2002 | Richardson et al. | |
| 6,475,621 B1 * | 11/2002 | Kohli et al. | 428/411.1 |
| 6,506,446 B2 | 1/2003 | Yamamoto et al. | |
| 6,606,832 B2 | 8/2003 | Richardson et al. | |
| 6,606,833 B2 | 8/2003 | Richardson et al. | |
| 2001/0026859 A1 | 10/2001 | Nakamura et al. | |
| 2002/0073645 A1 * | 6/2002 | Richardson et al. | 52/786.11 |
| 2003/0062813 A1 | 4/2003 | Cording | |
| 2003/0197449 A1 | 10/2003 | Cording | |
| 2003/0205059 A1 | 11/2003 | Roche et al. | |
| 2004/0137155 A1 | 7/2004 | Bernheim et al. | |
| 2004/0172892 A1 * | 9/2004 | Cremaschi | 52/171.3 |
| 2004/0194388 A1 | 10/2004 | Roche et al. | |
| 2004/0253471 A1 * | 12/2004 | Thiel et al. | 428/544 |
| 2005/0064101 A1 | 3/2005 | Messere et al. | |
| 2005/0064173 A1 | 3/2005 | Messere et al. | |
| 2005/0100730 A1 | 5/2005 | Messere et al. | |

* cited by examiner

ANTI-FOG REFRIGERATION DOOR AND METHOD OF MAKING THE SAME

This application is a continuation-in-part of U.S. application Ser. No. 11/229,835, filed Sep. 20, 2005, now abandoned which claims benefit of U.S. Provisional Application No. 60/610,964, filed Sep. 20, 2004, and U.S. Provisional Application No. 60/700,308, filed Jul. 19, 2005, all of which are hereby incorporated in their entireties into the present application.

FIELD OF THE INVENTION

The present invention relates, generally, to refrigeration doors, insulated glass units, and refrigeration systems, and, in particular, to an anti-fog or anti-frost energy-free refrigeration door providing condensation control, thermal insulation, and a desired amount of visible transmittance. More particularly, the refrigeration door of the present invention achieves these desired characteristics through the application of a low-emissivity coating, without electrically heating the door and through the application of an anti-fog/anti-frost coating or film. Throughout this application the term "refrigeration door" is meant to refer to a door used for freezers, refrigerators and similar units and cabinets. In addition, for purposes of this application the term "energy-free" (as in energy-free refrigeration door) means that electricity is not applied to the glass to heat the glass. "Anti-fog" and "anti-frost" refer to a coating or film which reduces or eliminates the clearing time for a refrigeration door, insulated glass unit (IGU), or other article described herein.

BACKGROUND OF THE INVENTION

All United States Patents and Patent Application Publications referred to herein are hereby incorporated by reference in their entireties. In the case of conflict, the present specification, including definitions, will control.

Refrigeration doors for commercial freezers, refrigerators and the like are typically constructed of glass to allow the customer to view the products placed therein for sale without opening the door. However, when condensation forms on the glass (sometimes referred to as "fogging"), the customer is not able to see through the door to identify the products inside, which is undesirable from the standpoint of both the customer and the store owner or retailer. The formation of frost presents similar problems.

Moisture condenses on the outside of the glass refrigeration door because the surface temperature of the outside of the glass is reduced below the ambient temperature in the store by the colder refrigerated interior of the freezer or refrigerator. When the temperature of the surface of the glass drops below the dew point of the air in the store, moisture condenses on the surface of the glass. In addition, when a door is opened in a humid environment, the innermost sheet of glass, which forms the inside of the door, is also momentarily exposed to the ambient air of the store and condensation may form on the inside of the door as well. The condensation on the inside of the glass door also occurs because the temperature of the inside of the glass door is below the dew point of the ambient store air to which it is exposed.

As previously indicated, condensation on the glass door, which may become frost, prevents the customer from seeing the products for sale through the glass door. Consequently, when condensation or frost is on the glass door, the customer must perform the unpleasant task of opening the refrigeration door to identify the contents inside, which is impractical in a store with a large number of freezers or refrigerators. Not only is opening every refrigeration door tedious and time consuming from the customer's perspective, it is undesirable from the retailer's standpoint as well, since it significantly increases the energy consumption of the retailer's freezers and refrigerators, thereby resulting in higher energy costs to the retailer.

There are various industry performance standards which refrigeration doors are required to comply with in order to be acceptable. In the United States, much of the industry requires freezer doors (but not refrigerator doors) that prevent external condensation when used in an environment with an outside temperature of eighty degrees Fahrenheit (80 F), an outside relative humidity of sixty percent (60%), and an inside temperature of minus forty degrees Fahrenheit (−40 F). Other countries have different requirements.

As is well known in the art, a typical refrigeration door is comprised of an insulating glass unit (IGU) housed in a door frame. The IGU in a refrigeration door is, typically, comprised of two or three sheets of glass sealed at their peripheral edges by a sealant assembly, generally referred to as an edge seal. In an IGU comprised of three sheets of glass, two insulating chambers are formed between the three sheets of glass. In an IGU comprised of two sheets of glass, a single insulating chamber is formed. Typically, IGUs for refrigerators are constructed of two sheets of glass, while IGUs for freezers employ three sheets of glass. Once sealed, the chambers are often filled with an inert gas such as argon, krypton, or other suitable gas to improve the thermal performance of the IGU.

Most conventional approaches to preventing or reducing condensation in a refrigeration door involve supplying energy to the door by including a conductive coating on one or more of the glass surfaces of the IGU for electrically heating the glass. The purpose of heating the glass is to maintain the temperature of the glass above the dew point of the warmer ambient air of the store. By heating the glass above the dew point, the undesirable condensation and frost are prevented from forming on the glass in the door, providing a clear view through the glass to the interior of the refrigeration compartment.

In a door consisting of a three-paned IGU, an unexposed surface of one or two of the sheets of glass is coated with a conductive material. The conductive coating is connected to a power supply by two bus bars or other electrical connectors mounted on opposite edges of the glass. As current passes through the coating, the coating heats, thereby heating the glass sheet to provide a condensation-free surface. The coating on the IGU of a refrigeration door is normally applied to the unexposed surface of the outermost glass sheet. However, because condensation sometimes forms on the inside of the inner sheet of glass, the unexposed surface of the innermost sheet of glass may also be coated for heating to prevent condensation.

There are numerous drawbacks and problems associated with these conventional heated refrigeration doors of the prior art. First, heating the door incurs an energy cost above and beyond the energy costs of the cooling system. In a standard size commercial freezer, the additional cost to heat a freezer door is substantial—based on current electrical utility pricing, such additional costs can be $100 per year or more for each freezer. Considering that many stores utilize multiple freezers, with some supermarkets and other food retailers utilizing hundreds of freezers, the cumulative energy costs associated with such heated freezer doors are significant.

Second, excess heat from conventional heated refrigeration doors will migrate to the refrigeration compartment, creating an additional burden on the cooling system, which results in still greater energy costs. Third, if the power supplied to the door for heating is too low, is turned off, or is shut down due to a power outage, condensation and/or frost will form on the glass. If the power dissipation is too high, unnecessary additional energy costs will be incurred. In order to reduce the occurrence of these problems, such heated glass doors often require precise control of the door heating system. In order to achieve the necessary precise control of the door heating system, an electrical control system is required, which results in increased design and manufacturing costs, as well as substantial operational and maintenance costs.

Fourth, these electrically heated glass doors present a safety hazard to customers and a potential risk of liability and exposure to retailers and refrigeration system manufacturers. The voltage applied to the glass door coating is typically 115 volts AC. The shopping carts used by customers in stores are heavy and metal. If the shopping cart strikes and breaks the glass door, electricity may be conducted through the cart to the customer, which could cause serious injury or even death.

U.S. Pat. Nos. 5,852,284 and 6,148,563 disclose applying a voltage to a glass coated with a conductive coating (which may be a low emissivity coating) to control the formation of condensation on the outer surface of the glass door. The conductive coating, such as a low emissivity coating, provides a resistance to the electricity, which produces heat, while also providing desirable thermal characteristics. However, the refrigeration doors disclosed in these patents suffer from the previously described drawbacks and problems associated with all electrically heated refrigeration doors. Glass units, doors, refrigeration units and the like are also described in U.S. Pat. Nos. 6,367,223, 6,606,832, and 6,606,833, and in U.S. Patent Application Publication Nos. US2003/0062813 and US2003/197449. As indicated, these and other U.S. Patents and applications are hereby incorporated by reference in their entireties into this application.

In addition to being used for conductivity, such low emissivity coatings have been employed as another means for reducing condensation on refrigeration doors. Specifically, one method of increasing the insulating value of glass (the "R value"), and reducing the loss of heat from the refrigeration compartment, is to apply a low emissivity (low E) coating to the glass. A low E coating is a microscopically thin, virtually invisible metal or metallic oxide layer(s) deposited on a glass surface to reduce the emissivity by suppressing radiative heat-flow through the glass. Emissivity is the ratio of radiation emitted by a black body or a surface and the theoretical radiation predicted by Planck's law. The term emissivity is used to refer to emissivity values measured in the infrared range by the American Society for Testing and Materials (ASTM) standards. Emissivity is measured using radiometric measurements and reported as hemispherical emissivity and normal emissivity. The emissivity indicates the percentage of long infrared wavelength radiation emitted by the coating. A lower emissivity indicates that less heat will be transmitted through the glass. Consequently, the emissivity of a sheet of glass or of an IGU impacts the insulating value of the glass or IGU as well as the heat conductivity (the "U value") of the glass or IGU. The U value of a sheet of glass or of an IGU is the inverse of its R value.

In a multi-pane IGU, the emissivity of the IGU, which is the combined emissivity of the sheets of the glass that form the IGU, may be approximated by multiplying the emissivity of all the sheets of glass together. For example, in a two-sheet IGU with each sheet of glass having an emissivity of 0.5, the total emissivity would be 0.5 multiplied by 0.5 or 0.25.

While low E coatings have been applied to IGUs used in refrigeration doors both with and without electrically heating the doors, such coatings and IGUs are not capable of controlling condensation and providing the required thermal insulation through the broad range of temperatures and environments in which such refrigeration doors are utilized without applying electricity to heat the doors. More specifically, notwithstanding the use of such low E coatings, refrigeration doors that are not heated have failed to provide condensation control in applications in which the interior temperature of the refrigeration compartment is substantially near or below freezing.

Moreover, typical anti-fog/anti-frost coatings, films, etc. and methods of applying them suffer limitations as well. For example, the films can still permit the formation of water droplets, which appear as the fog and obscure vision. Also, the anti-fog properties are often lost after a brief water soak or repeated cleanings. Moreover, known anti-fog products that function by absorbing condensate can saturate and fail under very humid conditions, due at least in part to their highly swollen state. Also, these products can scratch or smudge easily, and are not sufficiently tolerant or resistant to common solvents. Furthermore, common coating problems, such as drips, runs, trapped dust and chemical crazing can occur with typical anti-fog products.

Thus, not withstanding the available electrically heated and low emissivity coated refrigeration doors and available anti-fog and anti-frost products such as films and coatings, there is a need for a refrigeration door: (1) that provides the necessary condensation control and thermal insulation over a broad range of temperatures and environments; (2) with the desired amount of visible transmittance; (3) that avoids unnecessary energy costs and undue burden on the cooling system by eliminating the need for supplying electrical power to heat the door; (4) that does not require an expensive and complex electrical control system, thereby minimizing design, manufacturing, operation, and maintenance costs; and (5) that does not present a safety hazard to customers and a potential risk of liability and exposure to manufacturers and retailers, and that otherwise overcomes or reduces the problems described above.

SUMMARY OF THE INVENTION

An objective of the present invention is to overcome the deficiencies of the prior art described above by providing an energy-free refrigeration door with condensation control, thermal insulation, and a desired amount of visible transmittance.

Another objective of the present invention is to provide a refrigeration door that does not employ electrical energy in order to reduce condensation on the glass.

Another objective of the present invention is to provide a refrigeration door that controls condensation and that does not transfer significant heat to the interior of the freezer or refrigerator, thereby further burdening the cooling system and increasing energy costs.

Still another objective of the present invention is to provide a refrigeration door with condensation control that is easier and more economical to manufacture, operate, and maintain than the prior art refrigeration doors and systems.

Yet another objective of the present invention is to provide a refrigeration door with condensation control that is easier to design, operate, and maintain.

Another objective of the present invention is to provide a method for making a refrigeration door with condensation control that does not use electricity to heat the glass to control the condensation.

Yet another objective of the present invention is to provide a refrigeration door with an emissivity of less than 0.04.

Still another objective of the present invention is to provide a refrigeration door with an emissivity of approximately 0.0025.

Yet another objective of the present invention is to provide a refrigeration door with a U value of less than 0.2 BTU/hr-sq ft-F.

Still another objective of the present invention is to provide a refrigeration door with a U value of approximately 0.16 BTU/hr-sq ft-F.

Yet another objective of the present invention is to provide a refrigeration door with additional anti-fog and anti-frost properties that reduce clearing time to zero or near zero.

Further objectives include providing an anti-fog or anti-frost coating or film for use in a refrigeration door, as well as refrigeration systems and IGU's that include such films on a substrate surface.

The present invention achieves these objectives and others by providing, inter alia, energy-free refrigeration doors, and methods for making the same. In an aspect, the invention comprises a door frame housing an insulating glass unit comprising inner, middle and outer sheets of glass. A first sealant assembly disposed around the periphery of the inner and middle sheets of glass forms a first chamber between the inner and middle sheets of glass. A second sealant assembly disposed around the periphery of the middle and outer sheets of glass forms a second chamber between the middle and outer sheets of glass. A gas, such as krypton, air, or argon is held in the first and second chambers. The outer sheet of glass and inner sheet of glass each have an unexposed surface that faces the middle sheet of glass. A low emissivity coating is disposed on the unexposed surfaces of the inner and outer sheets of glass so that the glass door as a whole has a U value that prevents formation of condensation on the outer surface of the outer sheet of the glass door, without the application of electricity to heat the door, while also providing the desired evaporation rate of condensation from the inner side of the inner sheet of the glass door. An anti-fog/anti-frost coating or film is disposed on a surface of one of the glass sheets, preferably the exposed surface of the inner sheet.

In an aspect, the invention also provides a novel anti-fog/anti-frost coating.

The anti-fog/anti-frost coating is useful in various applications, such as insulated glass units, including those having multiple panes, refrigeration and freezer doors for refrigerated and freezer display cases, automotive mirrors, particularly external mirrors, saunas, steam rooms, shower doors, ticket booth windows, bathroom windows, bathroom mirrors, outside coolers and freezers that are exposed to high humidity or rain, and any other applications in which an anti-frost or anti-fog coating/film would be desired. Thus, although the anti-fog/anti-frost coatings of the present invention are preferably used in connection with energy free refrigeration and freezer doors, they are also well suited for a variety of other applications, including doors having energy applied thereto, such as electrically heated doors.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
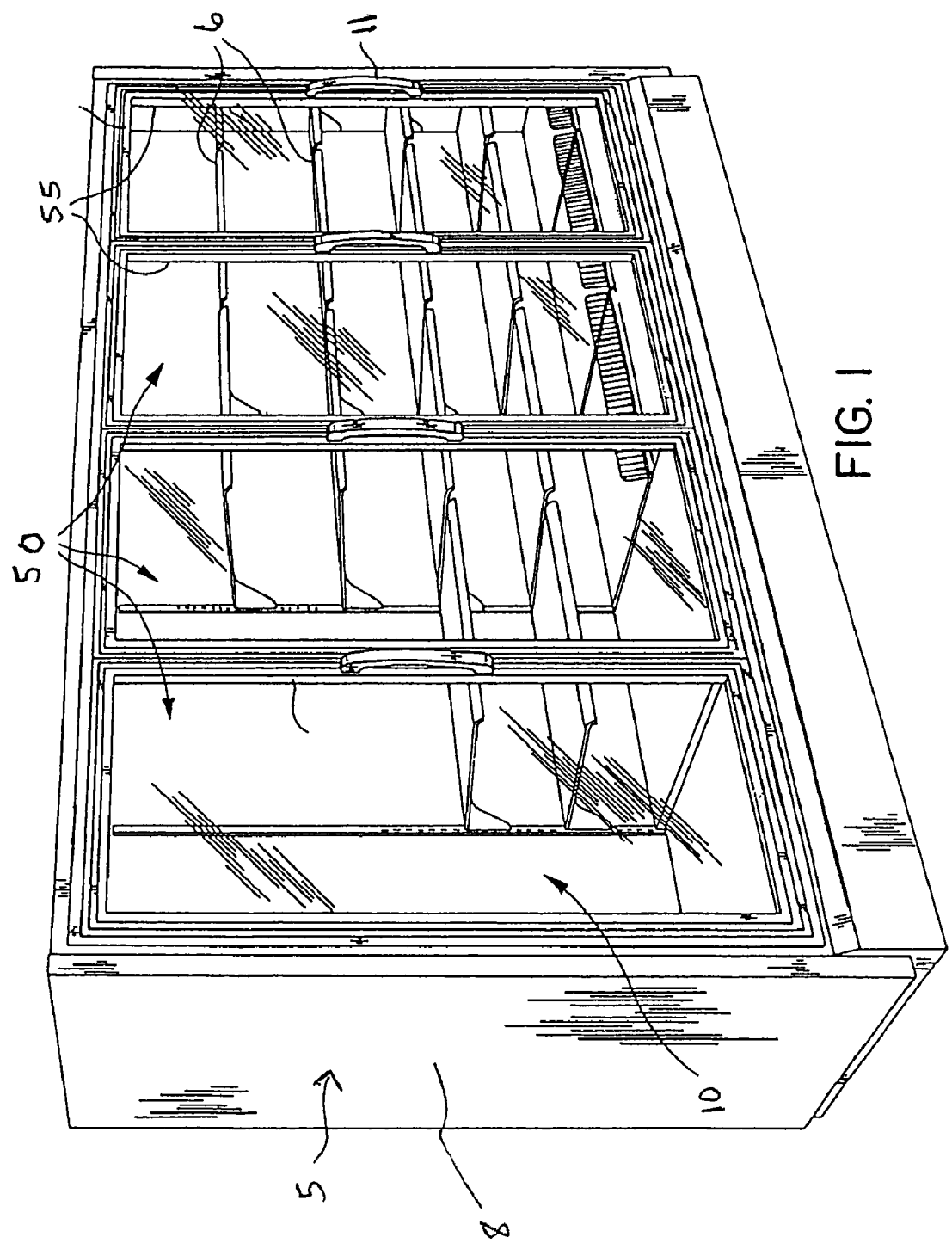
FIG. 1 depicts a refrigeration system employing an embodiment in accordance with the present invention.

In the following description, for purposes of explanation and not limitation, specific details are set forth, such as particular coatings, coating processes, sheet and film thicknesses, seal assemblies, number of sheets, sheet spacings, and methods for assembling the door, etc. in order to provide a thorough understanding of the present invention. However, it will be apparent to one skilled in the art that the present invention may be practiced in other embodiments that depart from these specific details. Detailed descriptions of well-known coatings, coating processes, sealant assemblies, and methods for assembling the door are omitted so as not to obscure the description of the present invention. For purposes of this description of the invention, terms such as external, internal, outer, and inner are descriptions from the perspective of the inside of the freezer or refrigerator compartment as is evident from the figures.

Testing, as well as computer modeling, has shown that a U value (the conductivity of transfer of heat through the glass) of approximately 0.2 BTU/hr-sq ft-F is required for the refrigeration door to prevent condensation on the outside of the glass under the performance requirements for the United States industry as described above. As discussed, however, when the door is opened, condensation may form on the inside of the inner sheet of glass of the door because the temperature of the inner surface of the sheet is below the dew point of the more humid ambient store air to which it is exposed. The condensation, however will dissipate once the door is closed as the moisture evaporates into the freezer or refrigerator compartment.

While the condensation is present on the inside of the door, the contents of the freezer or refrigerator are not visible through the door. Consequently, the speed of the evaporation, which determines the length of time during which the condensation is present (referred to as "clearing time"), is an important design criterion. The more heat that is transferred through the glass door to the inner surface of the glass door, the faster the condensation on the inside of the door will evaporate. However, increased heat transfer through the door also results in increased energy costs from the cooling system. Consequently, the optimal U value of the glass door will be driven by numerous factors including the difference between the outside and inside temperatures, the glass thickness, the spacing, the gas(es) used in the chamber(s) of the IGU, the number of sheets, the spacer material, the ambient humidity, the absorption coefficient of the coating in the far infrared spectrum, as well as the desirable time for evaporation of the condensation. In addition, the costs associated with the selected components (i.e., the gas, the sealant assembly, the glass, etc.), the energy costs, and other factors are also design considerations. The preferred embodiment described below provides a U value of 0.16 BTU/hr-sq ft F that prevents condensation on the outside of the door, while permitting enough heat to penetrate through the door from the ambient external environment to allow condensation on the inside of the door to evaporate in a reasonable amount of time. Some refrigeration system manufacturers require that the condensation evaporate within a few minutes and others require evaporation within one minute. In alternate embodiments, the U-value may be substantially equal to or less than 0.16 BTU/hr-sq ft F. The time required for the condensation to evaporate will vary according to the amount of time the door is open, the humidity in the store, the refrigeration system compartment temperature, the refrigeration system contents, the heat transferred through the door (which is dependent on the U value), and other factors.

Figure 2:
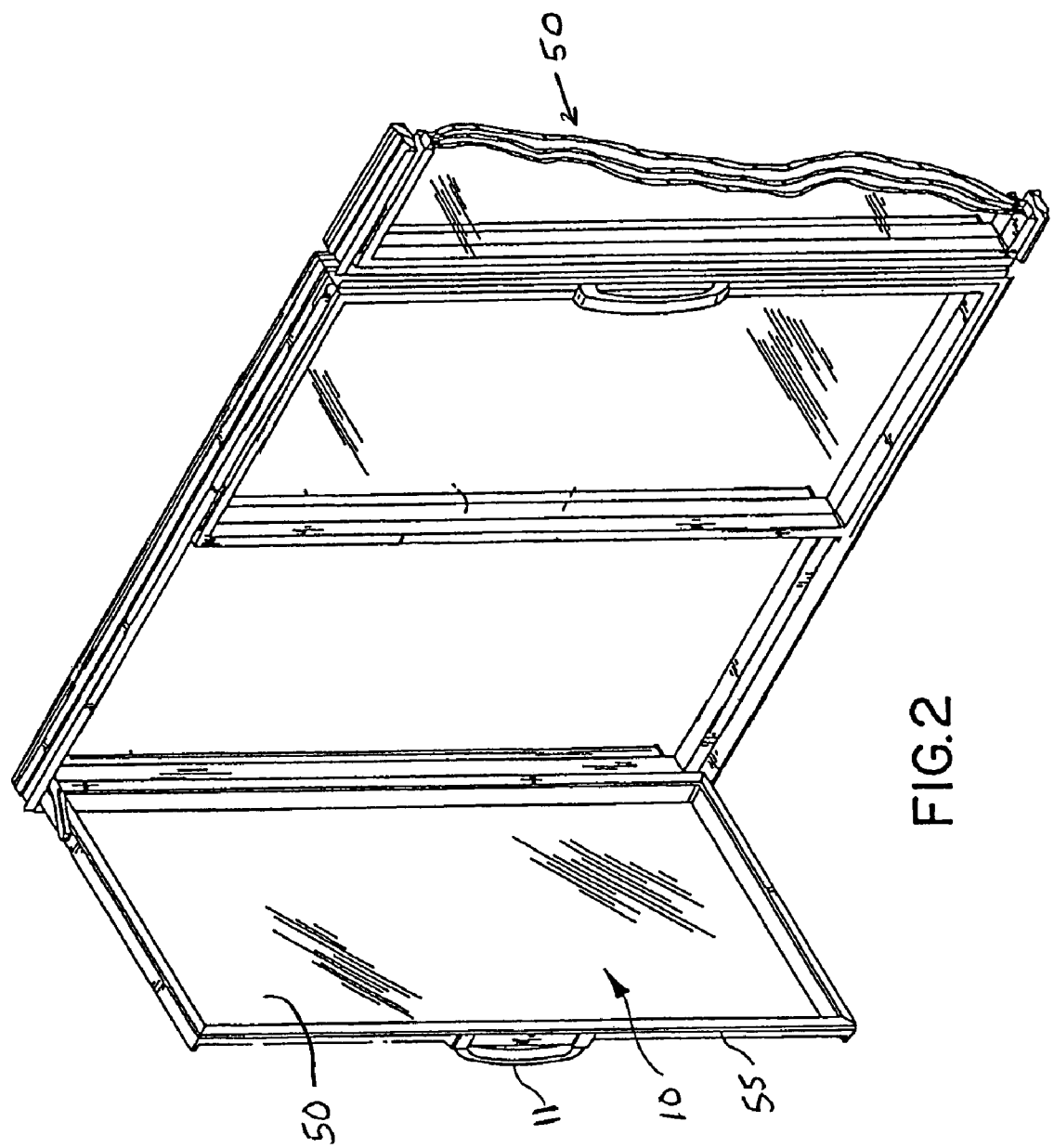
FIG. 2 depicts a refrigeration door according to the present invention.

In an embodiment of the present invention, as shown in FIG. 1, a refrigeration system 5 includes a plurality of transparent refrigeration doors 10 with each having a handle 11. As will be discussed in more detail below, each refrigeration door 10 includes an IGU 50 mounted in a frame 55. The interior of the refrigeration system includes a plurality of shelves 6 for holding merchandise to be seen through the door. Referring to FIG. 2, the refrigeration door 10 of the present embodiment is mounted to the opening of the refrigeration system with a hinge, which allows the door to open outwards.

Figure 3:
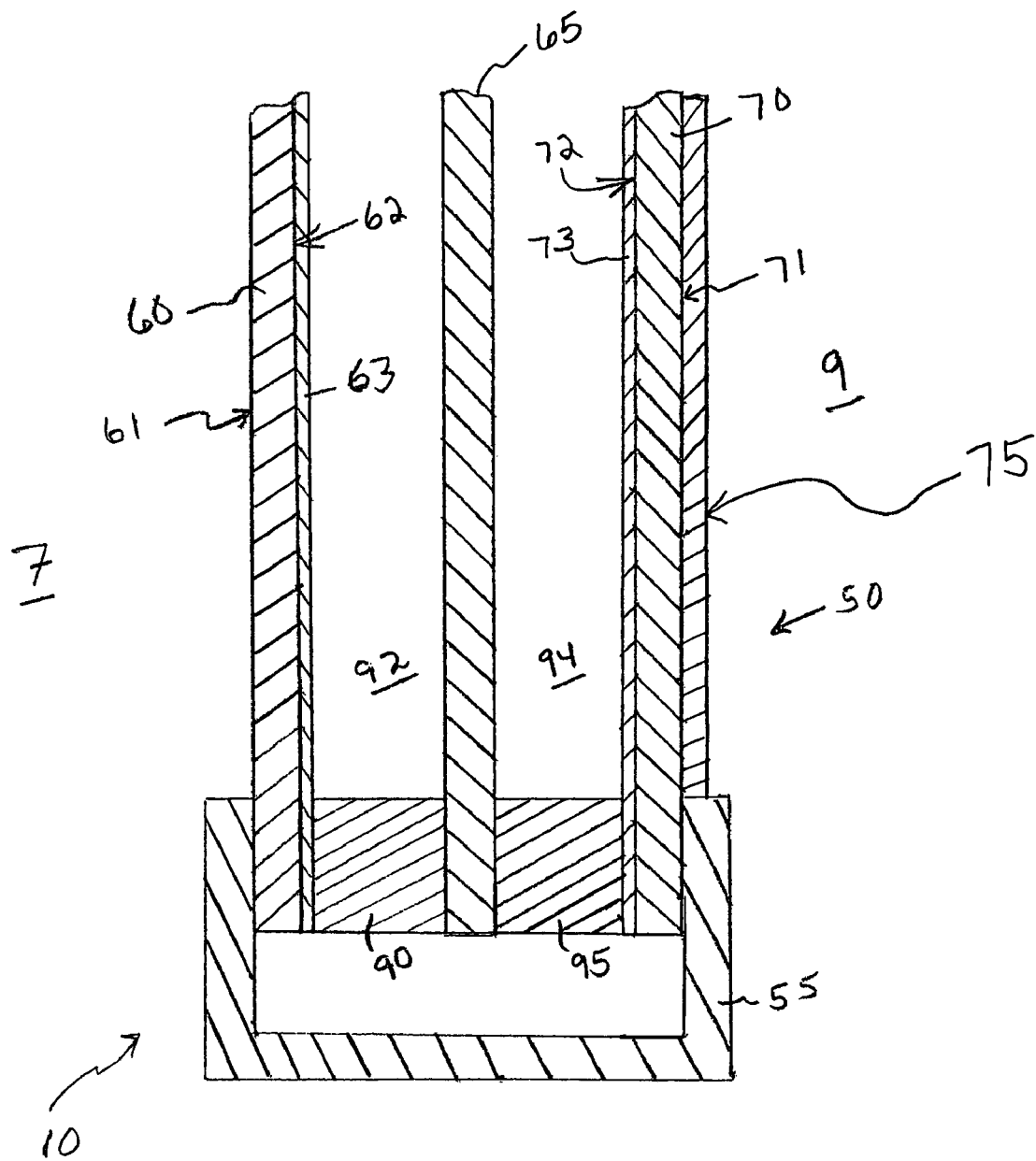
FIG. 3 is an illustration of a partial cross-sectional view of a refrigeration door according to the present invention.

As discussed above, the refrigeration door 10 includes an IGU 50 housed in a frame 55. As shown in FIG. 3, the IGU 50 is comprised of an outer sheet of glass 60, a middle sheet of glass 65, and an inner sheet of glass 70. The IGU 50 is housed in frame 55 and also includes a first sealant assembly 90 that extends around the periphery of the inner surface 62 of the outer sheet 60 and the outer surface of the middle sheet 65 of glass to define a substantially hermetically sealed insulated outer chamber 92. Similarly, a second sealant assembly 95 extends around the periphery of the outer surface 72 of the inner sheet 70 and inner surface of the middle sheet 65 of glass to define a substantially hermetically sealed insulated inner chamber 94.

The outer surface 61 of the outer sheet of glass 60 is positioned adjacent the external ambient environment 7. In other words, the outer surface 61 of the outer sheet of 60 is exposed to the environment in which the refrigerator or freezer resides. The inner surface 62 of the outer sheet 60 forms part of, and is exposed to, the outer chamber 92.

In this preferred example embodiment, the outer sheet 60 is one eighth of an inch thick, tempered, and the inner surface 62 of the outer sheet 60 is coated with a low emissivity coating 63. Specifically, in this embodiment, the low E coating is a sputter-coated low E coating that includes an ultra-hard titania as the base layer to ensure a high level of thermal performance and a high visible transmittance. This particular sputter coated glass can be tempered after the coating and offers high visible light transmission without high levels of color tinting. The outer surface 61 of outer sheet 60 is not coated. In this embodiment, the outer sheet 60 may, for example, be (without limitation) a sheet of Comfort Ti-PS glass, one eighth of an inch thick, manufactured by AFG Industries, Inc. of Kingsport, Tenn., which has a low E coating providing an emissivity of 0.05. As is well-known in the art, the Comfort Ti-PS is cut to the appropriate size, tempered, and edged before being integrated into the IGU 50. The low-E glass referred to herein is not limited to the above specifically named products, but may be any suitable low E glass, including, without limitation, sputter coated and pyrolytic coated low E glass.

The middle sheet of glass 65 is positioned between the outer 60 and inner 70 sheets of glass and forms part of the outer chamber 92 and the inner chamber 94. The middle sheet 65 is spaced one half inch from the outer sheet 60 and inner sheet 70 and is a one eighth of an inch thick, uncoated, sheet of tempered glass.

The inner sheet of glass 70 is positioned adjacent the interior of the freezer or refrigerating compartment 9, with its inner surface 71 exposed to the interior of the compartment 9. The outer surface 72 of the inner sheet 70 forms part of, and is exposed to, the inner chamber 94. The outer surface 72 of the inner sheet 70 of glass is also coated with a low emissivity coating 73. In this embodiment, the coating 73 on the outer surface 72 of the inner sheet 70 is the same as that described above with respect to the coating 63 of the inner surface 62 of the outer sheet 60. In preferred embodiments, the inner surface 71 has an anti-fog or anti-frost coating or film 75 applied to it, which reduces the clearing time during operation of the unit significantly, preferably to virtually zero (i.e. no visible fogging occurs).

Preferred anti-fog coatings or films include those known in the art as Vistex® and Visgard® Anti-Fog Films from Film Specialties, Inc. Such films may include an optical adhesive on the reverse side for installation. Vistex, for example, comprises a polymer cured on a clear polyester film with an optically clear adhesive on the reverse side. Vistex and Visgard® can be purchased on plastic film or as liquids. The films eliminate fogging in all temperature-humidity conditions. Moreover, fog and condensate formation is prevented even when the refrigerator or freezer door has been propped open for extended periods of time, such as during restocking. The anti-fog properties are not lost after a brief water soak or repeated cleanings, nor do the coatings saturate or fail under very humid conditions, such as those products that function by absorbing condensate. Preferred anti-fog films used in the present invention are hydrophilic, so moisture sheets out invisibly on the coated surface, rather than forming droplets which appear as fog and obscure vision. Moreover, preferred films are scratch resistant and include an acrylic adhesive on the reverse side. The adhesive is of a type typically used on solar control films and allows the film to be applied to any flat or cylindrical surface. The adhesive system can be pressure sensitive or detackified pressure sensitive, both optically clear. Various film thicknesses can be used, and one of ordinary skill in the art will readily be able to determine a suitable thickness for the application needed. The above noted coatings or films have a thickness of about 4 mil. The films can be installed on a glass surface with a squeegee. Preferred coating/film thicknesses for other embodiments discussed herein range from about 4 microns to about 20 microns. Films/coatings having a thickness of about 4 microns are suitable for mirrors. For best anti-frost performance, films/coatings between about 10 and about 20 microns are preferred, with 12 to 15 microns being particularly preferable.

Preferred films/coatings are permanent anti-fog or anti-frost films based on hydrophilic polymer technology. The anti-fog/anti-frost coating operates by reducing the surface tension of water causing the condensate to sheet out, thus eliminating fogging under all temperature and humidity conditions. Preferable coatings tolerate a great deal more handling abuse than most untreated plastics. Slight surface scratches that occur in the anti-fog film will actually heal themselves when exposed to moisture. Moreover, preferred coatings exhibit a high degree of chemical resistance and will withstand solvents such as isopropyl alcohol, toluene, or acetone, therefore protecting the substrate from solvent attack. Ordinary glass cleaners can be used when necessary.

Preferred films/coatings are insoluble in water, and will not smudge or dissolve when wet, in contrast to other anti-fog coatings known in the art. The preferred films/coatings are cured under controlled conditions, thereby eliminating common coating problems, such as drips, runs, trapped dust and chemical crazing. Moreover, the films add scratch resistance and a measure of shatter resistance to the glass to which they are applied. The adhesives will bond to glass or any plastic, even a hard surface treated to resist scratches.

With some known anti-fog and anti-frost films/coatings suitable for use in embodiments of the present invention, a cured primer is applied to the glass prior to application of the anti-fog or anti-frost film. A typical coating, Visgard®, publicly known and available from Film Specialties, Inc., as indicated above, contains a mixture ratio of 100:40 of "Part A" to "Part B" chemicals. The Visgard® Part A component includes diacetone alcohol (46%), N-methyl Pyrrolidone (4%), t-butanol (4%), Cyclohexane (8%), 2,4-pentanedione (6%), and Aromatic 150 (2%). The Visgard® Part B component includes polyisocyanate (66%), free monomeric isocyanates (1%), xylene (11%), n-butyl acetate (11%), and toluene (11%). As indicated, the Visgard® Part A and Part B components are readily available to the public. Furthermore, known films typically contain additional solvents, such as additional amounts of diacetone alcohol and tertiary butyl alcohol, for diluting the mixture. Moreover, processes for making the known films often include the requirement of two separate coating steps and two curing cycles. Curing time, temperature, and methodology can have a significant impact on anti-fog and anti-frost properties. For example, over-curing will significantly diminish the properties. Forced convection is the slowest method and more likely to result in over-curing a thin-skin of the coating, causing damage to the anti-fog and/or anti-frost properties Radiant energy is a quick and effective method of avoiding over-curing.

Some suitable coatings/films and aspects thereof are described in U.S. Pat. Nos. 4,467,073, 5,262,475, and 5,877,254, and U.S. Patent Application Publication Nos. US2003/0205059 A1, US2005/0064101, US2005/0064173, and US2005/0100730, all of which are hereby incorporated by reference in their entireties into the present application. These and the other patents and applications and description provided herein, provide ample guidance to one of skill in the art to readily practice the present invention.

The present invention also provides novel anti-fog and anti-frost coatings/films that exhibit improved properties over the above-noted and other known coatings/films. The invention further provides novel processes for making and applying such improved coatings/films. It has been found surprisingly, for example, that a mixture of Part A to Part B chemicals (described above in connection with Visgard®), in a ratio of about 100 units of Part A to about 25-45 units of Part B, yields improved anti-fog and anti-frost results over known films. A lower amount of the Part B component (which serves as a hardener) within the above range improves the anti-frost properties of the film while retaining scratch resistance. Good anti-fog properties can be achieved with a much higher percentage of the Part B component. In preferred embodiments, the ratio is about 100 units of Part A component to about 30-33 units of Part B component. In particularly preferred embodiments, the ratio is about 100 units Part A to about 30 units Part B.

It also has been found surprisingly that eliminating the use of additional solvents, such as additional diacetone alcohol and tertiary butyl alcohol, (particularly eliminating additional diacetone alcohol) enhances anti-fog and/or anti-frost performance. Elimination of such solvents enhances anti-frost performance in particular. However, adding at least one such solvent, tertiary butyl alcohol, has been found to not hinder anti-frost performance. Furthermore, in embodiments of the present invention, the cured primer typically included in previously known films has been eliminated by pre-treating the glass substrate with a silane, and adding a different silane to the anti-fog/anti-frost mix. For example, the silane pre-treatment can help the polymer coating adhere to the substrate under extreme chemical conditions or long term moisture soaking. In preferred embodiments, the silane added to the mixture is 3-glycidoxypropyl trimethoxysilane ("3-G"). Including this silane has been surprisingly found to increase abrasion (i.e. scratch) resistance, and to promote adhesion and weatherability. 3-glycidoxypropyl trimethoxysilane also does not promote yellowing of the film as do some silanes. In preferred embodiments, the 3-glycidoxypropyl trimethoxysilane is present in an amount of about 1% to about 8%, most preferably about 6%.

(3-glycydoxypropyl) trimethoxysilane provides a benefit in terms of moisture resistance. The anti-fog or anti-frost coating is tested in a "P-1 box," which is 140 F rain with high UV. Without 3-G, the coating will last 2 or 3 days before there is some peeling in the P-1 box. In contrast, with 3-G, the coating typically will last more than 8 weeks, and exhibit no peeling. This represents a 30 fold improvement over coatings lacking 3-G. To calculate a preferred quantity of 3-G to use, the sum of the volumes of Part A and Part B chemicals is multiplied by 6%.

The addition of functional silanes enables the use on a glass substrate of an anti-fog or anti-frost coating material designed for plastic. This is also a significant reason why others in the art often have been unsuccessful in introducing product with sufficient chemical and moisture resistance to damage. Other silane additives also can be used with similar effect. Moreover, other suitable additives and primers are those that can promote adhesion of urethane to inorganic compounds, such as glass. These materials include, without limitation, polymers that have an affinity to glass.

The invention also provides novel processes for making and applying the above films. In an aspect, the invention provides methods in which coating steps can be reduced to a single coating with a single curing cycle. Among other advantages, this reduces the opportunity for the damaging effects of over-curing. Furthermore, in embodiments of the invention, the coating or film is applied with a curtain coater. Adjustments are made to prevent excessively high Reynolds numbers in the curtain to avoid semi-turbulent and turbulent flow regimes. For example, in embodiments, a standard weir-type curtain coater can be modified to give the desired laminar flow. Such modifications can include limiting the size of the weir lip to avoid semi-turbulent flow regimes.

In alternate embodiments, the substrate, preferably glass, can be pre-treated with a silane (preferably Silquest A-1106 amino alkyl silicone) to promote wetting and adhesion. A special silane is applied by mixing about 1% or less of the silane in the rinse water of a glass washer. Such a process eliminates some of the additional steps required in prior known processes. The impact of the amino alkyl silicone wash in boosting adhesion and chemical resistance to peeling is substantial. Without a pre-wash of amino alkyl silicone, the coating potentially can be removed by soaking in acetone for about two minutes. Pre-washing the glass with amino alkyl silicone has been shown to prevent peeling for more than 3 weeks in the acetone test. This represents a 15,000 fold improvement. In preferred embodiments of the present invention, approximately 3 ounces of amino alkyl silicone in about 75 gallons (or similar ratio) of wash water is used to achieve this effect. Therefore, while some anti-fog and anti-frost coatings or films are known, and can be used in combination with the other aspects of the invention described herein, the present invention also provides novel anti-frost and anti-fog coatings/films that exhibit improved characteristics over those previously seen in the art, and novel processes for making and applying them. In embodiments, the invention provides anti-fog and anti-frost films/coatings with modified ratios of Part A and Part B chemicals (as referred to above) in the mix, and coatings/films that do not include certain typically used solvents. Moreover, in embodiments of the present invention, the characteristics of the films can be enhanced by modifications to the curing cycle. The substrate can also be pre-treated to promote wetting and adhesion.

Thus in an aspect, the invention provides polymer compositions which have anti-fogging and anti-frost-forming properties upon drying or curing. In preferred embodiments, the compositions comprise a chemical mix ratio of about 100:30 Part A to Part B chemicals (described herein) and do not include solvents, dilutants, or cured primers that are applied to the glass substrate. In alternate embodiments, the mix includes a silane, preferably 3-glycidoxypropyl trimethoxysilane. Preferred compositions promote scratch resistance, adhesion and weatherability.

In another aspect, the invention provides refrigeration doors comprising a substantially transparent substrate having an anti-fog or anti-frost coating on at least a portion thereof, the portion of the substrate substantially not fogging or frosting when the portion has an initial surface temperature and is then exposed to a moist air ambient with a dewpoint temperature equal to or greater than the surface temperature for a period of time. The surface temperature may be less than about 0 degrees C. and the period of time may be up to 6 seconds or more.

The invention also provides a method of making a refrigeration door having a substantially transparent substrate, the method comprising forming an anti-fog or anti-frost coating as described herein on at least a portion of the substrate wherein the substrate is part of a refrigeration door or is used to manufacture a refrigeration door. In an embodiment, the method includes mixing Part A and Part B chemicals to form a mixture, applying the mixture to at least a portion of the substrate and curing the substrate. The invention further provides IGUs comprising a substrate having an anti-fog or anti-frost coating on at least a portion thereof as described herein, refrigeration doors comprising such an IGU, refrigeration systems comprising the refrigeration doors. Moreover, in further embodiments, the invention provides a refrigerator door comprising a substantially transparent substrate having on at least a portion thereof a coating which prevents the condensation of water thereon when said portion maintained at a temperature of about −28 degrees C. is exposed to an atmosphere at a temperature of about 25 degrees C. for up to 12 seconds or more. The prevention of condensed droplets results in the prevention of the formation of light scattering fog or frost.

In the embodiment described in FIG. 3, the inner sheet 70 may also, for example, be, without limitation, a sheet of Comfort Ti-PS, one eighth of an inch thick, manufactured by AFG Industries, Inc., which has the described characteristics and coating.

In this exemplified embodiment, the chambers 92 and 94 are both filled with air. In alternative embodiments, each chamber may be filled with the same or a different gas and the chambers could be filled with krypton, argon, or other suitable gas.

The sheets 60, 65 are held apart by a first sealant assembly 90 which extends around the periphery of the sheets 60, 65 maintaining the glass sheets in parallel, spaced-apart relationship creating chamber 92 between the sheets 60, 65, while also sealing the chamber 92 from the external environment. Likewise, the sheets 65, 70 are held apart by a second sealant assembly 95 which extends around the periphery of the sheets 65, 70 maintaining the glass sheets in parallel, spaced-apart relationship creating chamber 94 between the sheets 65, 70 while also sealing the chamber 94 from the external environment. The sealant assemblies 90, 95 maintain a one half inch space between the outer sheet 60 and middle sheet 65 and inner sheet 70 and middle sheet 65, respectively.

The sealant assemblies 90, 95 of the present embodiment are preferably, warm edge seals. "Warm edge" is used to describe an insulating glass sealing assembly that reduces heat loss better than conventional aluminum spacers and sealant combinations. Each of the sealant assemblies 90, 95 of this embodiment includes its own spacer and desiccant, which replaces the need for a separate sealant, metallic spacer, and desiccant, and has a heat transfer rate of 0.84 Btu/hr-ft-F (sometimes referred to as K value). The sealant assemblies 90, 95 in this embodiment are a composite extrusion containing a combination of polyisobutylene sealant, hot melt butyl sealant, desiccant matrix, rubber shim and a vapor barrier. Suitable sealant assemblies of this type are manufactured and sold by TruSeal Technologies of Beachwood, Ohio, under the name "COMFORT SEAL."

Referring to FIG. 3, IGU 50 is shown. IGU 50 is comprised of glass sheets 60, 65, and 70 integrated by sealant assemblies 90 and 95. IGU 50 is installed in frame 55 in any suitable manner well-known to those skilled in the art. The frame 55 is made from extruded plastic or other suitable well-known frame materials, such as extruded aluminum, fiber glass or other material. If, in any alternative embodiment the frame 55 is formed of aluminum or other material, the door may require heating along its edges to ensure condensation control around the edges of the door.

Referring to FIG. 1, a refrigeration system 5 is shown. The door frame 55 is coupled to the refrigeration compartment 8 in any suitable fashion as is well known in the art, such as a single door long hinge, multiple hinges, or in a slot for sliding the door open and closed. In addition, the frame may include a door handle 11 or other suitable actuating means as is appropriate for the application. The refrigeration system 5, of which the door 10 forms a part, may be any system used for cooling a compartment, such as that disclosed in U.S. Pat. No. 6,148,563, which is hereby incorporated herein by reference.

The above preferred embodiment provides a refrigeration door with a U value of 0.16 BTU/hr-sq ft-F (and emissivity of 0.0025), which has been found to be suitable for freezer door applications requiring the performance standards identified above with respect to the United States industry. A U value of 0.16 BTU/hr-sq ft-F permits the refrigeration door to easily meet the required performance standards, while also allowing enough heat to penetrate through the door with the external ambient environment to evaporate condensation formed on the inside of the door in a reasonable time period. In addition, the preferred embodiment provides a visible light transmittance of sixty-six percent (66%). In the above preferred embodiment, which includes an anti-fog/anti-frost coating or film as described, no fogging or frost formation is observed on the glass.

As an alternative to the Comfort Ti-PS glass, other low E coated glass may be used, such as, for example, Comfort Ti-R, Comfort Ti-AC, Comfort Ti-RTC, and Comfort Ti-ACTC, all of which are available from AFG Industries, Inc., which like Comfort Ti-PS, are titania/silver based low E coated glass manufactured by AFG Industries, Inc. Another suitable type of glass is Comfort E2, which is coated with a pyrolytic process and is a fluorine doped tin oxide low E coated glass, one eighth of an inch thick, and which is manufactured by AFG Industries, Inc. Comfort E2 is suitable for some of the less stringent performance standards because of its higher emissivity. The low-E glass referred to herein is not limited to the above specifically named products, but may be any suitable low E glass, including, without limitation, the above noted, and other sputter coated and pyrolytic coated low E glass.

The U value of the refrigeration door 10 is determined by a number of design factors including the number of sheets of glass, the thickness of the sheets, the emissivity of the IGU, the spacing between the sheets, and the gas in the chamber(s). In the three pane refrigeration door 10 of the preferred embodiment described above, the U value of 0.16 BTU/hr-sq ft-F is accomplished using air as the gas being held in the chambers, glass thicknesses of one eighth of an inch on all sheets, one half inch spacing, and an IGU emissivity of 0.0025. However, each of these factors can be varied resulting in numerous permutations of values that could be combined to provide the same U value. In addition, other applications may require a smaller or larger U value depending on the environment, costs constraints, and other requirements or considerations.

A number of computer simulations have been performed to determine the U values of numerous IGUs for use in refrigeration doors 10 with a range of values of each of the various design parameters combined in different permutations. The table below includes the design parameters and corresponding calculated U values for a number of three pane IGU configurations. In addition to the design parameters listed in Table 1 below, all of the three pane IGU U value calculations were computed with each pane being one eighth of an inch thick, and a total of two sides of the three panes being low E coated. Tempering of the glass does not significantly affect the calculated performance values. Moreover, the addition of the anti-fog/anti-frost coating or film in accordance with the invention does not significantly affect these values.

TABLE 1

| Spacing between Sheets (inches) | Gas in Chambers | Type of Coating | Emissivity of IGU | U value (Btu/hr-sq ft-F) |
|---|---|---|---|---|
| ½ | air | Ti-PS | 0.0025 | 0.16 |
| 5/16 | air | Ti-PS | 0.0025 | 0.22 |
| ½ | argon | Ti-PS | 0.0025 | 0.12 |
| 5/16 | argon | Ti-PS | 0.0025 | 0.17 |
| ½ | krypton | Ti-PS | 0.0025 | 0.11 |
| 5/16 | krypton | Ti-PS | 0.0025 | 0.11 |
| ½ | air | CE2 | 0.04 | 0.20 |
| 5/16 | air | CE2 | 0.04 | 0.26 |
| ½ | argon | CE2 | 0.04 | 0.17 |
| 5/16 | argon | CE2 | 0.04 | 0.21 |
| ½ | krypton | CE2 | 0.04 | 0.15 |
| 5/16 | krypton | CE2 | 0.04 | 0.15 |

In each of the tables included herein, "Ti-PS" refers to the low E coating of AFG Industries' Comfort Ti-PS glass and "CE2" refers to the low E coating of AFG Industries' Comfort E2 glass, both described above. In addition, the U values in the tables are calculated as "center of the glass" values, because the computer simulation does not have the capability to consider the sealant assembly. Consequently, there are no sealant assembly data or design criteria listed in the tables.

Figure 4:
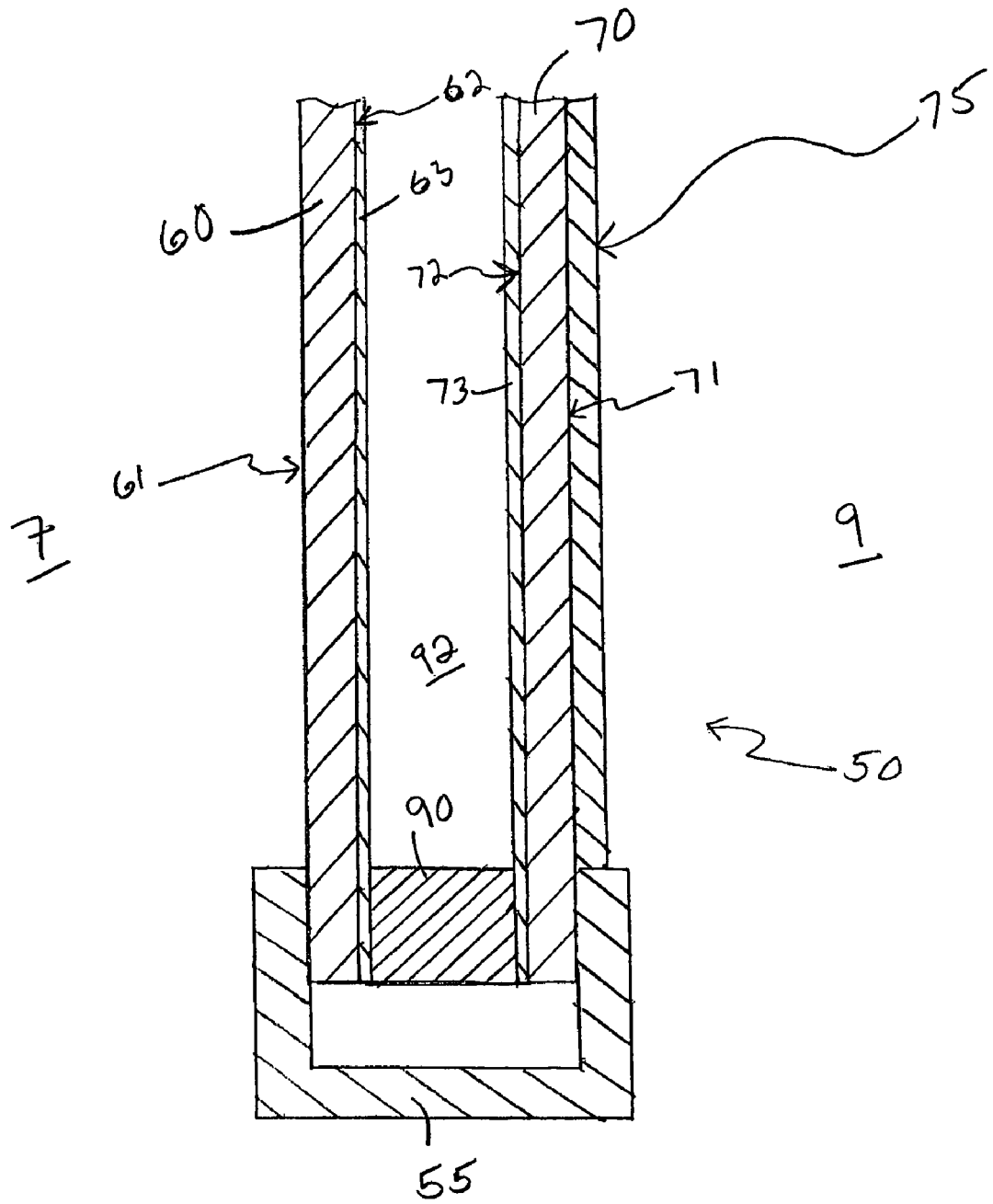
FIG. 4 is an illustration of a partial cross-sectional view of a refrigeration door according to the present invention.

In an alternative two pane embodiment of the present invention shown in FIG. 4, the IGU 50 includes an outer sheet 60 and inner sheet 70 of glass, the frame 55, and a sealant assembly 90. In this two-pane embodiment, both the outer sheet 60 and inner sheet 70 are one eighth of an inch thick and include the same low E coating as described in the first embodiment, which is titania based silver low E coating. Again, both the outer sheet 60 and inner sheet 70 may, for example, be a sheet of Comfort Ti-PS glass, one eighth of an inch thick, manufactured by AFG Industries, Inc. The coated sides of the sheets 60 and 70 are on the unexposed surfaces of the sheets, sides 62 and 72, respectively, which form part of the chamber 92. In addition, the same sealant assembly 90 described above (the COMFORT SEAL) may be used and acts to provide a spacing of one half inch between the outer 60 and inner 70 sheets of glass. Again, the anti-fog/anti-frost coating or film 75 is disposed on the exposed surface 71 of inner sheet 70.

Table 2 below includes design parameters and the corresponding calculated U values for a number of two pane IGUs. In addition to the design parameters listed in the table below, all of the two pane calculations were computed with each pane being one eighth of an inch thick, and a total of two sides of the two panes being low E coated. Tempering of the glass does not significantly effect the calculated performance values, nor does addition of an anti-fog/anti-frost coating or film as described herein.

TABLE 2

| Spacing between Sheets (inches) | Gas in Chambers | Type of Coating | Emissivity of IGU | U value (Btu/hr-sq ft-F) |
|---|---|---|---|---|
| ½ | air | Ti-PS | 0.0025 | 0.29 |
| 5/16 | air | Ti-PS | 0.0025 | 0.36 |
| ½ | argon | Ti-PS | 0.0025 | 0.23 |
| 5/16 | argon | Ti-PS | 0.0025 | 0.28 |
| ½ | krypton | Ti-PS | 0.0025 | 0.22 |
| 5/16 | krypton | Ti-PS | 0.0025 | 0.20 |
| ½ | air | CE2 | 0.04 | 0.32 |
| 5/16 | air | CE2 | 0.04 | 0.39 |
| ½ | argon | CE2 | 0.04 | 0.27 |
| 5/16 | argon | CE2 | 0.04 | 0.31 |
| ½ | krypton | CE2 | 0.04 | 0.26 |
| 5/16 | krypton | CE2 | 0.04 | 0.24 |

In alternate embodiments, any suitable type of coating processes for the low-E coating may be employed including pyrolytic (e.g., as in the Comfort E2), which is often referred to as chemical vapor deposition (CVD), spray, and sputter coating (e.g., as in the Comfort Ti-PS). Furthermore, these processes may be applied using well-known off-line or on-line manufacturing methods as is suitable and appropriate for the quantity and type of production and process. Likewise, any suitable low E coating may be employed including silver based or fluorine doped tin oxide coating.

Although the embodiments described above include low E coatings on the unexposed surfaces of two sheets of glass, other embodiments of the present invention might include a low E coating applied to only one sheet of glass on either side, or on both sides. Likewise, in other embodiments the middle sheet of glass (of a three pane embodiment) may include a low E coating on either side (or both sides) instead of, or in addition to, coatings on the inner sheet 70 and outer sheet 60 of glass.

In yet another three pane embodiment, the inner sheet of glass 70 does not have a low E coating on either side of the sheet of glass 70. Likewise, in an alternative to the two sheet embodiment described above, the low E coating is present on only one sheet, or on both sides of both sheets. In general, the number of sheets that have the low E coating and the side (or sides) that have the coating is a design choice. The total emissivity of the IGU, which along with other factors determines the U factor of the door, is more important with respect to the thermal performance than which side or sides of which sheet(s) are coated. In addition, although the embodiments described herein have emissivities of less than or equal to 0.04 for refrigeration door applications, using a high performance gas (such as krypton) may enable an IGU with an emissivity of slightly more than 0.04 to provide the necessary condensation control in some circumstances.

intended use of the embodiment. More specifically, the exterior ambient temperature, interior temperature, and exterior ambient humidity (and associated dew point) are important factors in determining the necessary U value for the design, which in turn, determines the design parameters (type of glass, emissivity, number of sheets, gas, etc.).

The left five columns of Table 3 below provide a list of calculated U values for various applications of the intended use and includes the exterior temperature, interior temperature, exterior humidity, and calculated dew point for each U value. In addition, the right three columns of Table 3 provide an embodiment of the invention that will provide the necessary U value.

TABLE 3

Calculated U Values for Various Environmental Parameters

| Exterior | | U Value | Dewpoint | Maximum Relative | IGU Design Variables For Satisfying Identified U Value | | |
|---|---|---|---|---|---|---|---|
| Temp Deg F. | Interior Temp Deg F. | Btu/ hr-sq ft-F. | (Outside Glass T) Deg F. | Humidity Percent | Glass (Two Sheets) | Spacing Inches | Gas In Chambers |
| 80 | −40 | 0.19 | 64.9 | 60.1 | Ti—PS | ⅜ | air |
| 72 | 0 | 0.27 | 57.4 | 60 | CE2 | 5/16 | air |
| 80 | −40 | 0.15 | 67.6 | 66.0 | CE2 | ⅜ | krypton |
| 80 | −40 | 0.18 | 65.7 | 61.8 | CE2 | ⅜ | argon |
| 80 | −40 | 0.25 | 60.3 | 51.1 | CE2 | ⅜ | air |
| 80 | −40 | 0.16 | 67.3 | 65.3 | CE2 | ½ | krypton |
| 80 | −40 | 0.17 | 66.5 | 63.5 | CE2 | ½ | argon |
| 80 | −40 | 0.20 | 64.1 | 58.5 | CE2 | ½ | air |
| 80 | −40 | 0.11 | 70.6 | 73.1 | Ti—PS | ⅜ | krypton |
| 80 | −40 | 0.14 | 68.6 | 68.3 | Ti—PS | ⅜ | argon |
| 80 | −40 | 0.19 | 65.0 | 60.3 | Ti—PS | ⅜ | air |
| 80 | −40 | 0.12 | 70.2 | 72.1 | Ti—PS | ½ | krypton |
| 80 | −40 | 0.13 | 69.4 | 70.2 | Ti—PS | ½ | argon |
| 80 | −40 | 0.17 | 66.7 | 64.0 | Ti—PS | ½ | air |
| 72 | −10 | 0.18 | 61.2 | 68.9 | CE2 | ⅜ | argon |
| 72 | 0 | 0.18 | 62.1 | 71.1 | CE2 | ⅜ | argon |
| 72 | 10 | 0.18 | 63.0 | 73.4 | CE2 | ⅜ | argon |
| 70 | 0 | 0.18 | 60.3 | 71.4 | CE2 | ⅜ | argon |
| 80 | 0 | 0.18 | 69.2 | 69.7 | CE2 | ⅜ | argon |
| 90 | 0 | 0.18 | 78.1 | 68.3 | CE2 | ⅜ | argon |
| 70 | −20 | 0.21 | 55.5 | 60.1 | CE2 | ⅜ | air |
| 86 | −22 | 0.11 | 77.5 | 75.9 | Ti—PS | ⅜ | krypton |
| 80 | −40 | 0.19 | 65.0 | 60.3 | CE1 | ½ | air |
| 70 | 32 | 0.18 | 63.4 | 79.6 | CE2 | ⅜ | argon |
| 80 | 32 | 0.18 | 72.2 | 77.2 | CE2 | ⅜ | argon |
| 90 | 32 | 0.18 | 81.0 | 75.0 | CE2 | ⅜ | argon |

In other embodiments, other sealant assemblies may be employed including for example, an all-foam, non-metal assembly such as the SUPER SPACER, manufactured by EdgeTech, Inc, which has a heat transfer rate of approximately 1.51 Btu/hr-ft-F. Another suitable sealant assembly is the THERMOPLASTIC SPACERSYSTEM (TPS) manufactured by Lenhardt Maschinenbau GmbH, which has a heat transfer rate of approximately 1.73 Btu/hr-ft-F.

The spacing in the above disclosed embodiments is one half inch. However, while the preferred spacing ranges between five sixteenths of an inch to one half inch, other embodiments of the invention may use spacings up to three quarters of an inch. In addition, while the above disclosed embodiments employ glass one eighth of an inch thick that is tempered (except for the middle sheet), other embodiments may use untempered glass or thicknesses that are greater than, or less than, one eighth of an inch.

The design parameters of an embodiment of the present invention will be determined, in part, by the application or The design parameters of Table 3 identify the type of glass (which is one eighth of an inch thick), the spacing between sheets, and the gas in the chambers. In addition, all of the IGUs of the Table 3 include a third, non-coated sheet of glass that is one eighth of an inch thick, and that is disposed between the two sheets of glass identified in the table. CE1 in the Table 3 refers to Comfort E1, which has an emissivity of 0.35 and is sold by AFG Industries, Inc.

In an aspect, therefore, the invention provides a refrigeration door adapted for use in a refrigerating compartment, the door comprising an inner sheet of glass including a first surface and a second surface, said first surface of said inner sheet being disposed adjacent the interior of the refrigerating compartment, an outer sheet of glass including a first surface and a second surface, said first surface of said outer sheet being disposed adjacent the exterior environment of the refrigerating compartment a middle sheet of glass disposed between said inner and outer sheets of glass, a first sealant assembly disposed around the periphery of said inner sheet of glass and said middle sheet of glass for maintaining said inner sheet and said middle sheet in spaced-apart relationship from each other, a second sealant assembly disposed around the periphery of said middle sheet of glass and said outer sheet of glass for maintaining said middle sheet and said outer sheet in spaced-apart relationship from each other, a first low emissivity coating adjacent the second surface of said inner sheet of glass, a second low emissivity coating adjacent the second surface of said outer sheet of glass, said inner sheet, outer sheet, middle sheet, first sealant assembly, second sealant assembly, and said first and second low emissivity coatings forming an insulating glass unit having a U value substantially preventing the formation of condensation on said first surface of said outer sheet of glass without the application of electricity for heating said first surface of said outer sheet of glass, an anti-fog or anti-frost coating on a surface of the inner sheet, and a frame secured around the periphery of said insulating glass unit. The insulating glass unit can have a U value substantially equal to or less than 0.2 BTU/hr-sq ft-F.

The invention also provides a refrigeration door adapted for use in a refrigerating compartment, the door comprising an inner sheet of glass including a first surface and a second surface, said first surface of said inner sheet being disposed adjacent the interior of the refrigerating compartment, an outer sheet of glass including a first surface and a second surface, said first surface of said outer sheet being disposed adjacent the exterior environment of the refrigerating compartment a middle sheet of glass disposed between said inner and outer sheets of glass, a first sealant assembly disposed around the periphery of said inner sheet of glass and said middle sheet of glass for maintaining said inner sheet and said middle sheet in spaced-apart relationship from each other, a second sealant assembly disposed around the periphery of said middle sheet of glass and said outer sheet of glass for maintaining said middle sheet and said outer sheet in spaced-apart relationship from each other, a first low emissivity coating adjacent the second surface of said inner sheet of glass, a second low emissivity coating adjacent the second surface of said outer sheet of glass, said inner sheet, outer sheet, middle sheet, first sealant assembly, second sealant assembly, and said first and second low emissivity coatings forming an insulating glass unit having an emissivity equal to or less than 0.04 substantially preventing the formation of condensation on said first surface of said outer sheet of glass without the application of electricity for heating said first surface of said outer sheet of glass, an anti-fog or anti-frost coating on a surface of the inner sheet, and a frame secured around the periphery of said insulating glass unit.

In embodiments, the interior temperature of the refrigerating compartment is substantially equal to or less than minus twenty degrees Fahrenheit; the temperature of the exterior environment is substantially equal to or greater than seventy degrees Fahrenheit; and the humidity in the exterior environment is substantially equal to or greater than sixty percent, the first surface of the outer sheet of glass is substantially free of condensation and no fogging or frost formation occurs on the inner sheet.

In further embodiments, the interior temperature of the refrigerating compartment is substantially equal to or less than zero degrees Fahrenheit, the temperature of the exterior environment is substantially equal to or greater than seventy two degrees Fahrenheit, and the humidity in the ambient environment is substantially equal to or greater than sixty percent, the first surface of the outer sheet of glass is substantially free of condensation and no fogging or frost formation occurs on the inner sheet.

The invention further provides refrigeration doors (and IGUs, and refrigeration systems comprising them) having an outer surface and adapted for use in a refrigerating compartment, the door comprising a first sheet of glass, a second sheet of glass, a first sealant assembly disposed around the periphery of the first sheet of glass and the second sheet of glass for maintaining the first sheet and second sheet in spaced-apart relationship from each other, a first low emissivity coating adjacent a surface of the first sheet or the second sheet of glass, the first sheet and second sheets of glass, the first sealant assembly, and the first low emissivity coating forming an insulating glass unit having a U value substantially equal to or less than 0.2 BTU/hr-sq ft-F, an anti-fog or anti-frost coating on a surface of one of the sheets and a frame secured around the periphery of the insulating glass unit.

The invention further provides refrigeration doors (and IGUs, and refrigeration systems comprising them) having an outer surface and adapted for use in a refrigerating compartment, the door comprising a first sheet of glass, a second sheet of glass, a first sealant assembly disposed around the periphery of the first sheet of glass and the second sheet of glass for maintaining the first sheet and second sheet in spaced-apart relationship from each other, a first low emissivity coating adjacent a surface of the first sheet or the second sheet of glass, the first sheet and second sheets of glass, the first sealant assembly, and the first low emissivity coating forming an insulating glass unit having an emissivity equal to or less than 0.04, an anti-fog or anti-frost coating on a surface of one of the sheets and a frame secured around the periphery of the insulating glass unit.

The invention also provides a method of manufacturing a refrigeration door component having an outer surface, said method comprising the steps of providing a first sheet of glass; providing a second sheet of glass; providing a first low emissivity coating adjacent a surface of said first sheet of glass or said second sheet of glass; disposing a first sealant assembly around the periphery of said first sheet of glass and said second sheet of glass to maintain said first sheet and said second sheet in spaced-apart relationship from each other; providing an anti-fog or anti-frost coating on one of the sheets of glass; and wherein said first sheet of glass, said second sheet of glass, and said first sealant assembly form an insulating glass unit having a U value substantially preventing the formation of condensation on the outer surface of the refrigeration door component without the application of electricity for heating the door component and substantially preventing fog or frost formation on a surface of the component. The insulating glass unit can have a U value substantially equal to or less than 0.2 BTU/hr-sq ft-F. In alternate embodiments, the method includes providing a third sheet of glass, which may include a low-E coating adjacent at least one of its surfaces; disposing a second sealant assembly disposed around the periphery of said second sheet of glass and said third of glass for maintaining said second sheet and said third sheet in spaced-apart relationship from each other; and wherein said insulating glass unit further includes said third sheet of glass and said second sealant assembly.

The invention also provides a method of manufacturing a refrigeration door component having an outer surface, said method comprising the steps of providing a first sheet of glass; providing a second sheet of glass; providing a first low emissivity coating adjacent a surface of said first sheet of glass or said second sheet of glass; disposing a first sealant assembly around the periphery of said first sheet of glass and said second sheet of glass to maintain said first sheet and said second sheet in spaced-apart relationship from each other; providing an anti-fog or anti-frost coating on one of the sheets of glass; and wherein said first sheet of glass, said second sheet of glass, and said first sealant assembly form an insulating glass unit an emissivity equal to or less than 0.04 substantially preventing the formation of condensation on the outer surface of the refrigeration door component without the application of electricity for heating the door component and substantially preventing fog or frost formation on a surface of the component. In alternate embodiments, the method includes providing a third sheet of glass, which may include a low-E coating adjacent at least one of its surfaces; disposing a second sealant assembly disposed around the periphery of said second sheet of glass and said third of glass for maintaining said second sheet and said third sheet in spaced-apart relationship from each other; and wherein said insulating glass unit further includes said third sheet of glass and said second sealant assembly.

The invention further provides a substantially transparent insulating glass unit door having an outer surface and being for use with a refrigerating compartment residing in an exterior environment and having an interior refrigerating compartment; said insulating glass unit door comprising a first sheet of glass; a second sheet of glass; a first sealant assembly disposed around the periphery of said first sheet of glass and said second sheet of glass for maintaining said first sheet and said second sheet in spaced-apart relationship from each other; a first low emissivity coating adjacent a surface of said first sheet or said second sheet of glass, and an anti-fog or anti-frost coating on a surface of one of said sheets, and said first sheet of glass, said second sheet of glass, and said first sealant assembly providing the insulating glass unit with a U value effective to substantially prevent the formation of condensation on the outer surface without the application of electricity to heat the outer surface of the insulating glass unit when the interior temperature of the refrigerating compartment is substantially equal to or less than zero degrees Fahrenheit; the temperature of the exterior environment is substantially equal to or greater than seventy degrees Fahrenheit; and the humidity in the exterior environment is substantially equal to or greater than sixty percent. Alternate embodiments further comprise a third sheet of glass; and a second sealant assembly disposed around the periphery of said second sheet of glass and said third of glass for maintaining said first sheet and said second sheet in spaced-apart relationship from each other, and may include a second low emissivity coating adjacent a surface of said first sheet, said second sheet or said third sheet of glass.

In alternate embodiments, the insulating glass unit has a U value that substantially prevents the formation of condensation on the outer surface when the interior temperature of the refrigerating compartment is substantially equal to or less than minus forty degrees Fahrenheit; the temperature of the exterior environment is at substantially equal to or greater than eighty degrees Fahrenheit; and the humidity in the exterior environment is substantially equal to or greater than sixty percent.

The invention further provides a refrigeration unit including an insulated enclosure defining a compartment, a cooling system, and a door adapted to be mounted on an opening of said compartment, said door having an outer surface and comprising a first sheet of glass, a second sheet of glass, a first sealant assembly disposed around the periphery of said first sheet of glass and said second sheet of glass for maintaining said first sheet and said second sheet in spaced-apart relationship from each other, a first low emissivity coating adjacent the a surface of said first or said second sheet of glass, said first sheet, second sheet, first sealant assembly, and said first low emissivity coating forming an insulating glass unit having a U value substantially preventing the formation of condensation on the outer surface of the door without the application of electricity for heating said first surface, an anti-fog coating on a surface of one of the sheets of glass; and a frame secured around the periphery of said insulating glass unit. The insulating glass unit can have a U value substantially equal to or less than 0.2. BTU/hr-sq ft-F. In alternate embodiments, the door further comprises a third sheet of glass and a second sealant assembly disposed around the periphery of said second sheet of glass and said third sheet of glass for maintaining said second sheet and said third sheet in spaced-apart relationship from each other.

The invention further provides a glass door for a refrigerated display case, the door comprising a first glass panel having an inside and an outside surface, a low emissivity coating on the inside surface of the first glass panel, a second glass panel having an inside and an outside surface, a low emissivity coating on the inside surface of the second glass panel, an intermediate glass panel between the first and second glass panel, a first spacer assembly between the first and intermediate glass panels and a second spacer assembly between the intermediate and second glass panels wherein the first and second spacer assemblies are formed from warm edge spacer assemblies, and anti-fog or anti-frost coating on a surface of one of the glass panels and a frame extending about and supporting at least one of the glass panels. In an embodiment, the first and second glass panels have widths and heights that are identical.

The foregoing has described principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While the application of the present invention has been described in the application of a refrigerator or freezer door, other applications might include vending machines, skylights, or refrigerated trucks, automotive mirrors, particularly external mirrors, saunas, steam rooms, shower doors, ticket booth windows, bathroom windows, bathroom mirrors, outside coolers and freezers that are exposed to high humidity or rain, and any other applications in which an anti-frost or anti-fog coating/film would be desired. In some of these applications, condensation on the second or colder side of the glass may not be an issue because the glass is not in a door that is periodically opened exposing the cold glass to a more humid environment. As a result, the key factors in designing the glass are economics (i.e., the energy costs and the cost of the glass and its installation), visible transmittance, durability, and other considerations.

While preferred embodiments of the present invention have been described above, it should be understood that such have been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A refrigeration door having an outer surface and adapted to be mounted on a refrigerating compartment, said door comprising:
   an insulating glass unit, comprising:
      a first sheet of glass;
      a second sheet of glass;
      a first sealant assembly disposed around the periphery of said first sheet of glass and said second sheet of glass for maintaining said first sheet and said second sheet in spaced-apart relationship from each other;
      a first low emissivity coating adjacent a surface of said first sheet or said second sheet of glass; and
      an anti-fog or anti-frost coating adjacent a surface of at least one of said sheets of glass; and
   a frame secured around the periphery of said insulating glass unit,
   wherein the surface having the anti-fog or anti-frost coating thereon is treated, prior to application of the anti-fog or anti-frost coating, with a solution comprising a first silane, and said anti-fog or anti-frost coating comprises a second silane, which second silane is different than the first silane,
   and said door has a U value substantially equal to or less than 0.2 BTU/hr-sq ft-F or an emissivity substantially equal to or less than 0.04.

2. The refrigeration door of claim 1, wherein the first silane comprises amino alkyl silicone.

3. The refrigeration door of claim 1, wherein the second silane comprises 3-glycidoxypropyl trimethoxysilane.

4. The refrigeration door of claim 1, wherein the anti-fog or anti-frost coating is applied as a film.

5. The refrigeration door of claim 1, wherein the anti-fog or anti-frost coating is applied as a liquid.

6. The refrigeration door of claim 1, wherein the anti-fog or anti-frost coating has a thickness of about 4 microns to about 20 microns.

7. The refrigeration door of claim 6, wherein the anti-fog or anti-frost coating has a thickness of about 10 microns to about 20 microns.

8. The refrigeration door of claim 7, wherein the anti-fog or anti-frost coating has a thickness of about 12 microns to about 15 microns.

9. The refrigeration door of claim 1, wherein the anti-fog or anti-frost coating is insoluble in water.

10. The refrigeration door of claim 1, wherein the anti-fog or anti-frost coating further comprises a mixture of:
   i) a first component comprising about 46% diacetone alcohol, about 4% N-methyl Pyrrolidone, about 4% t-butanol, about 8% Cyclohexane, about 6% 2,4-pentanedione, and about 2% Aromatic 150; and
   ii) a second component comprising about 66% polyisocyanate, about 1% free monomeric isocyanates, about 11% xylene, about 11% n-butyl acetate, and about 11% toluene;
   wherein the mixture ratio of the first component to the second component is about 100:40.

11. The refrigeration door of claim 10, wherein the anti-fog or anti-frost coating further comprises a solvent for diluting the mixture.

12. The refrigeration door of claim 11, wherein the solvent is an alcohol.

13. The refrigeration door of claim 12, wherein the alcohol is diacetone alcohol or tertiary butyl alcohol.

14. The refrigeration door of claim 1, wherein the anti-fog or anti-frost coating further comprises a mixture of:
   i) a first component comprising about 46% diacetone alcohol, about 4% N-methyl Pyrrolidone, about 4% t-butanol, about 8% Cyclohexane, about 6% 2,4-pentanedione, and about 2% Aromatic 150; and
   ii) a second component comprising about 66% polyisocyanate, about 1% free monomeric isocyanates, about 11% xylene, about 11% n-butyl acetate, and about 11% toluene;
   wherein the mixture ratio of the first component to the second component is about 100:about 25-45.

15. The refrigeration door of claim 14, wherein the mixture ratio of the first component to the second component is about 100:about 30-33.

16. The refrigeration door of claim 15, wherein the mixture ratio of the first component to the second component is about 100:about 30.

17. The refrigeration door of claim 14, wherein the second silane is present in an amount of about 1% to about 8%.

18. The refrigeration door of claim 14, wherein the second silane is present in an amount of about 6%.

19. The refrigeration door of claim 1, further comprising:
   a third sheet of glass;
   a second sealant assembly disposed around the periphery of said second sheet of glass and said third sheet of glass for maintaining said second sheet and said third sheet in spaced-apart relationship from each other; and
   wherein said insulating glass unit further includes said third sheet of glass and said second sealant assembly.

20. The refrigeration door of claim 19, wherein said second sealant assembly is a composite extrusion comprising a combination of polyisobutylene sealant, hot melt butyl sealant, desiccant matrix, rubber shim, and a vapor barrier.

21. The refrigeration door of claim 19, wherein at least one of said first sealant assembly and said second sealant assembly comprises a warm edge seal.

22. The refrigeration door of claim 19, further including a second low emissivity coating adjacent a surface of said first sheet, said second sheet, or said third sheet of glass.

23. The refrigeration door of claim 22, wherein:
   the first sheet of glass is an inner sheet of glass including a first surface and a second surface, said first surface of said inner sheet being disposed adjacent the interior of the refrigerating compartment;
   the third sheet of glass is an outer sheet of glass including a first surface and a second surface, said first surface of said outer sheet being disposed adjacent the exterior environment of the refrigerating compartment;
   the second sheet of glass is a middle sheet of glass disposed between said inner and outer sheets of glass;
   the first sealant assembly being disposed around the periphery of said inner sheet of glass and said middle sheet of glass for maintaining said inner sheet and said middle sheet in spaced apart relationship from each other;
   the second sealant assembly being disposed around the periphery of said middle sheet of glass and said outer sheet of glass for maintaining said middle sheet and said outer sheet in spaced-apart relationship from each other;
   the first low emissivity coating being adjacent the second surface of said inner sheet of glass;
   the second low emissivity coating being adjacent the second surface of said outer sheet of glass;
   said inner sheet, outer sheet, middle sheet, first sealant assembly, second sealant assembly, and said first and second low emissivity coatings forming the insulating glass unit wherein the formation of condensation on said first surface of said outer sheet of glass is substantially prevented without the application of electricity for heating said first surface of said outer sheet of glass.

24. The refrigeration door of claim 23, wherein the anti-fog or anti-frost coating is adjacent the first surface of said inner sheet of glass.

25. The refrigeration door of claim 23, wherein said first sealant assembly and said second sealant assembly each have a heat transfer rate substantially equal to or less than 1.73 Btu/hr-ft-F.

26. The refrigeration door of claim 23, further comprising:
a first chamber defined by said inner sheet of glass, said middle sheet of glass, and said first sealant assembly;
a second chamber defined by said middle sheet of glass, said outer sheet of glass, and said second sealant assembly; and
a gas disposed in said first and second chambers.

27. The refrigeration door of claim 26, wherein:
said inner, said middle, and said outer sheets of glass have a thickness substantially equal to one eighth of an inch;
said inner and said middle sheets of glass being spaced apart a distance substantially equal to one half inch; and
said middle and said outer sheets of glass being spaced apart a distance substantially equal to one half inch.

28. The refrigeration door of claim 26, wherein said first sealant assembly and said second sealant assembly each have a heat transfer rate substantially equal to or less than 1.73 Btu/hr-ft-F.

29. The refrigeration door of claim 28, wherein:
said inner, said middle and said outer sheets of glass having a thickness substantially equal to one eighth of an inch:
said inner and said middle sheets of glass being spaced apart a distance substantially equal to one half inch; and
said middle and said outer sheets of glass being spaced apart a distance substantially equal to one half inch.

30. The refrigeration door of claim 26, wherein said gas in said first chamber and said second chamber are the same.

31. The refrigeration door of claim 26, wherein said gas in said first chamber and said second chamber are not the same.

32. The refrigeration door of claim 26, wherein said first and second low emissivity coatings are selected from the group consisting of a titania based silver and fluorine doped tin oxide.

33. The refrigeration door of claim 26, wherein said first and second low emissivity coatings are applied with a process selected from the group consisting of sputter coating, pyrolytic coating and spray coating.

34. The refrigeration door of claim 26, wherein said frame is formed from a material selected from the group consisting of extruded plastic, aluminum, and fiber glass.

35. The refrigeration door of claim 1, wherein the U value of said insulating glass unit is effective to substantially prevent the formation of condensation on the outer surface of the door without the application of electricity for heating the outer surface when the interior temperature of the refrigerating compartment is substantially equal to or less than minus zero degrees Fahrenheit; the temperature of the exterior environment is substantially equal to or greater than seventy-two degrees Fahrenheit; and the humidity in the ambient environment is substantially equal to or greater than sixty percent.

36. The refrigeration door of claim 35, further comprising:
a first chamber defined by said first sheet of glass, said second sheet of glass, and said first sealant assembly; and
a gas disposed in said first chamber.

37. The refrigeration door of claim 36, wherein said first sealant assembly has a heat transfer rate substantially equal to or less than 1.73 Btu/hr-ft-F.

38. The refrigeration door of claim 36, wherein said gas is selected from the group consisting of argon, krypton, and air.

39. The refrigeration door of claim 1, wherein the interior temperature of the refrigerating compartment is substantially equal to or less than minus twenty degrees Fahrenheit; the temperature of the exterior environment is substantially equal to or greater than seventy degrees Fahrenheit; and the humidity in the exterior environment is substantially equal to or greater than sixty percent; and wherein the outer surface of the door is substantially free of condensation.

40. The refrigeration door of claim 1, wherein the interior temperature of the refrigerating compartment is substantially equal to or less than minus forty degrees Fahrenheit; the temperature of the exterior environment is substantially equal to or greater than eighty degrees Fahrenheit; and the humidity in the exterior environment is substantially equal to or greater than sixty percent; and wherein the outer surface of the door is substantially free of condensation.

41. The refrigeration door of claim 1, wherein said first sealant assembly is a composite extrusion comprising a combination of polyisobutylene sealant, hot melt butyl sealant, desiccant matrix, rubber shim, and a vapor barrier.

42. The refrigeration door of claim 1, wherein said first sealant assembly comprises a warm edge seal.

43. A method of manufacturing a refrigeration door component having an outer surface, said method comprising the steps of:
providing a first sheet of glass;
providing a second sheet of glass;
providing a first low emissivity coating adjacent a surface of said first sheet of glass or said second sheet of glass;
disposing a first sealant assembly around the periphery of said first sheet of glass and said second sheet of glass to maintain said first sheet and said second sheet in spaced-apart relationship from each other; and
providing an anti-fog or anti-frost coating adjacent a surface of at least one of said sheets of glass, wherein the surface having the anti-fog or anti-frost coating thereon is treated, prior to application of the anti-fog or anti-frost coating, with a solution comprising a first silane, and wherein said anti-fog or anti-frost coating comprises a second silane, which second silane is different than the first silane;
said first sheet of glass, said second sheet of glass, and said first sealant assembly forming an insulating glass unit wherein the formation of condensation on the outer surface of the refrigeration door component is substantially prevented without application of electricity for heating the door component, and wherein said refrigeration door component has a U value substantially equal to or less than 0.2 BTU/hr-sq ft-F or an emissivity substantially equal to or less than 0.04.

44. The method of claim 43, wherein said first sheet of glass, said second sheet of glass, and said first sealant assembly define a first chamber; and further comprising the step of disposing a gas in said first chamber.

45. The method of claim 43, further comprising the steps of:
providing a third sheet of glass;
disposing a second sealant assembly disposed around the periphery of said second sheet of glass and said third of glass for maintaining said second sheet and said third sheet in spaced-apart relationship from each other; and
wherein said insulating glass unit further includes said third sheet of glass and said second sealant assembly.

46. The method of claim 45, wherein said third sheet of glass includes a low emissivity coating adjacent a surface of said third sheet of glass.

47. The method of claim 45, wherein said first and second sealant assemblies have a heat transfer rate substantially equal to or less than 1.73 Btu/hr-ft-F.

48. The method of claim 45, wherein said second sealant assembly is a composite extrusion comprising a combination of polyisobutylene sealant, hot melt butyl sealant, desiccant matrix, rubber shim, and a vapor barrier.

49. The method of claim 45, wherein at least one of said first sealant assembly and said second sealant assembly comprises a warm edge seal.

50. The method of claim 43, wherein said first sealant assembly has a heat transfer rate substantially equal to or less than 1.73 Btu/hr-ft-F.

51. The method of claim 50, wherein:
said first and said second sheets of glass having a thickness substantially equal to one eighth of an inch; and
said first and said second sheets of glass being spaced apart a distance substantially equal to one half inch.

52. The method of claim 50, further including the step of disposing said insulating glass unit in a door frame.

53. The method of claim 43, further including the step of disposing said insulating glass unit in a door frame.

54. The method of claim 44, wherein said gas is selected from the group consisting of argon, krypton, and air.

55. The method of claim 43, wherein said low emissivity coating is selected from the group consisting of a titania based silver and fluorine doped tin oxide.

56. The method of claim 43, wherein said low emissivity coating is applied with a process selected from the group consisting of sputter coating, pyrolytic coating and spray coating.

57. The method of claim 43, wherein said first sealant assembly is a composite extrusion comprising a combination of polyisobutylene sealant, hot melt butyl sealant, desiccant matrix, rubber shim, and a vapor barrier.

58. The method of claim 43, wherein said first sealant assembly comprises a warm edge seal.

59. A substantially transparent insulating glass unit door having an outer surface and being for use with a refrigerating compartment residing in an exterior environment and having an interior refrigerating compartment; said insulating glass unit door comprising:
a first sheet of glass;
a second sheet of glass;
a first sealant assembly disposed around the periphery of said first sheet of glass and said second sheet of glass for maintaining said first sheet and said second sheet in spaced-apart relationship from each other;
a first low emissivity coating adjacent a surface of said first sheet or said second sheet of glass;
an anti-fog or anti-frost coating adjacent a surface of at least one of said sheets of glass, wherein the surface having the anti-fog or anti-frost coating thereon is treated, prior to application of the anti-fog or anti-frost coating, with solution comprising a first silane, and wherein said anti-fog or anti-frost coating comprises a second silane, which second silane is different than the first silane; and
said first sheet of glass, said second sheet of glass, and said first sealant assembly providing the insulating glass unit with a U value substantially equal to or less than 0.2 BTU/hr-sq ft-F or an emissivity substantially equal to or less than 0.04 effective to substantially prevent the formation of condensation on the outer surface without the application of electricity to heat the outer surface of the insulating glass unit when the interior temperature of the refrigerating compartment is substantially equal to or less than zero degrees Fahrenheit; the temperature of the exterior environment is substantially equal to or greater than seventy degrees Fahrenheit; and the humidity in the exterior environment is substantially equal to or greater than sixty percent.

60. The door of claim 59, further comprising:
a third sheet of glass; and
a second sealant assembly disposed around the periphery of said second sheet of glass and said third of glass for maintaining said first sheet and said second sheet in spaced-apart relationship from each other.

61. The door of claim 60, further including a second low emissivity coating adjacent a surface of said first sheet, said second sheet or said third sheet of glass.

62. The door of claim 61 wherein the insulating glass unit has a U value that substantially prevents the formation of condensation on the outer surface when the interior temperature of the refrigerating compartment is substantially equal to or less than minus forty degrees Fahrenheit; the temperature of the exterior environment is substantially equal to or greater than eighty degrees Fahrenheit; and the humidity in the exterior environment is substantially equal to or greater than sixty percent.

63. The door of claim 60, wherein said first sealant assembly and said second sealant assembly each have a heat transfer rate substantially equal to or less than 1.73 Btu/hr-ft-F.

64. The door of claim 60, wherein said second sealant assembly is a composite extrusion comprising a combination of polyisobutylene sealant, hot melt butyl sealant, desiccant matrix, rubber shim, and a vapor barrier.

65. The door of claim 60, wherein at least one of said first sealant assembly and said second sealant assembly comprises a warm edge seal.

66. The door of claim 59, wherein the interior temperature of the refrigerating compartment is substantially equal to or less than minus twenty degrees Fahrenheit; the temperature of the exterior environment is substantially equal to or greater than seventy degrees Fahrenheit; and the humidity in the exterior environment is substantially equal to or greater than sixty percent.

67. The door of claim 59, wherein the interior temperature of the refrigerating compartment is substantially equal to or less than minus forty degrees Fahrenheit; the temperature of the exterior environment is substantially equal to or greater than eighty degrees Fahrenheit; and the humidity in the exterior environment is substantially equal to or greater than sixty percent.

68. The door of claim 59, wherein said first sealant assembly is a composite extrusion comprising a combination of polyisobutylene sealant, hot melt butyl sealant, desiccant matrix, rubber shim, and a vapor barrier.

69. The door of claim 59, wherein said first sealant assembly comprises a warm edge seal.

70. A refrigeration unit including an insulated enclosure defining a compartment, a cooling system, and a door adapted to be mounted on an opening of said compartment, said door having an outer surface and comprising:
a first sheet of glass;
a second sheet of glass;
a first sealant assembly disposed around the periphery of said first sheet of glass and said second sheet of glass for maintaining said first sheet and said second sheet in spaced-apart relationship from each other;
a first low emissivity coating adjacent the a surface of said first or said second sheet of glass;
said first sheet, second sheet, first sealant assembly, and said first low emissivity coating forming an insulating glass unit wherein the formation of condensation on the outer surface of the door is substantially prevented without the application of electricity for heating said first surface;

an anti-fog or anti-frost coating adjacent a surface of at least one of said sheets of glass; and wherein the surface having the anti-fog or anti-frost coating thereon is treated, prior to application of the anti-fog or anti-frost coating, with a solution comprising a first silane, and wherein said anti-fog or anti-frost coating comprises a second silane, which second silane is different than the first silane; and a frame secured around the periphery of said insulating glass unit, and wherein said door has a U value substantially equal to or less than 0.2 BTU/hr-sq ft-F or an emissivity substantially equal to or less than 0.04.

71. The refrigeration unit of claim 70, further comprising:
a third sheet of glass; and
a second sealant assembly disposed around the periphery of said second sheet of glass and said third of glass for maintaining said second sheet and said third sheet in spaced-apart relationship from each other.

72. The refrigeration unit of claim 71, wherein said first sealant assembly and said second sealant assembly each have a heat transfer rate substantially equal to or less than 1.73 Btu/hr-ft-F.

73. The refrigeration unit of claim 71, wherein said second sealant assembly is a composite extrusion comprising a combination of polyisobutylene sealant, hot melt butyl sealant, desiccant matrix, rubber shim, and a vapor barrier.

74. The refrigeration unit of claim 71, wherein at least one of said first sealant assembly and said second sealant assembly comprises a warm edge seal.

75. The refrigeration unit of claim 70, further comprising:
a first chamber defined by said first sheet of glass, said second sheet of glass, and said first sealant assembly;
a second chamber defined by said middle sheet of glass, said outer sheet of glass, and said second sealant assembly; and
a gas disposed in said first and second chambers.

76. The refrigeration unit of claim 70, wherein said first sealant assembly has a heat transfer rate substantially equal to or less than 1.73 Btu/hr-ft-F.

77. The refrigeration unit of claim 70, wherein said first sealant assembly is a composite extrusion comprising a combination of polyisobutylene sealant, hot melt butyl sealant, desiccant matrix, rubber shim, and a vapor barrier.

78. The refrigeration unit of claim 70, wherein said first sealant assembly comprises a warm edge seal.

* * * * *